US012594207B2

(12) United States Patent
Alfonso

(10) Patent No.: US 12,594,207 B2
(45) Date of Patent: Apr. 7, 2026

(54) SANITARY BAG FOR MEDICAL USE

(71) Applicant: CLEANIS, Arcueil (FR)

(72) Inventor: Inès Alfonso, Echirolles (FR)

(73) Assignee: CLEANIS, Arcueil (FR)

( * ) Notice: Subject to any disclaimer, the term of this patent is extended or adjusted under 35 U.S.C. 154(b) by 72 days.

(21) Appl. No.: 18/390,732

(22) Filed: Dec. 20, 2023

(65) Prior Publication Data

US 2025/0195308 A1 Jun. 19, 2025

(30) Foreign Application Priority Data

Dec. 15, 2023 (FR) ...................................... 2314270

(51) Int. Cl.
*A61G 9/00* (2006.01)

(52) U.S. Cl.
CPC .................................... *A61G 9/00* (2013.01)

(58) Field of Classification Search
CPC ................................ A47K 11/00; A61G 9/00
USPC ............................................................ 4/451
See application file for complete search history.

(56) References Cited

U.S. PATENT DOCUMENTS

2013/0042401 A1* 2/2013 Smith .................... A47K 11/06 4/483
2015/0223783 A1 8/2015 Eschete et al.
2017/0290724 A1* 10/2017 Rojas ..................... A61G 9/003
2023/0363595 A1* 11/2023 Bayne ................. A47K 11/026

FOREIGN PATENT DOCUMENTS

FR 3081103 A1 * 11/2019 ............... A61F 5/44
JP 2023-53882 A 4/2023

OTHER PUBLICATIONS

Jul. 10, 2024 Search Report issued in French Patent Application No. 2314270.

* cited by examiner

*Primary Examiner* — Christine J Skubinna
(74) *Attorney, Agent, or Firm* — OLIFF PLC

(57) ABSTRACT

Sanitary bag for medical use intended for collecting waste produced by a patient, said sanitary bag including a leaktight envelope provided with an aperture, the envelope being formed from a plastic film, optionally, at least one tie for closing said aperture, the closing tie notably being slidably mounted in a hem of the envelope so that extraction of said closing tie from said hem reduces said aperture, wherein the plastic film of the envelope includes more than 30% recycled plastic.

20 Claims, 1 Drawing Sheet

SANITARY BAG FOR MEDICAL USE

TECHNICAL FIELD

The invention relates to a sanitary bag including recycled plastic intended for collecting waste, notably liquid waste, produced by a patient, notably in hospitals. The invention also relates to a process for manufacturing such a sanitary bag. The invention finally relates to a strip of such sanitary bags and to an assembly including such sanitary bags, and also to a package of said sanitary bags.

PRIOR ART

In hospitals, it may be necessary to collect the waste produced by certain patients (urine, excrement, vomit) because these patients are unable to go to the toilet, or for analytical purposes. To this end, patients may have recourse to sanitary bags, which can be arranged, as required, on a support, such as a bedpan, a commode bucket or a toilet. Such a sanitary bag is described, for example, in patent FR 3 081 103.

Known sanitary bags are mainly composed of virgin plastic. With a view to being more environmentally friendly, manufacturers conducted research to reduce the proportion of virgin plastic in these bags. However, this is a complex process. Replacing part of the virgin plastic with organic materials, such as corn starch, thus proved to be impossible, due firstly to the excessively rapid degradation of organic materials, which limits the service life of the sanitary bags, and secondly to the poor mechanical performance of the sanitary bags resulting from this combination, which are, for example, more sensitive to friction or fingernail marks, making them susceptible to piercing. Ensuring that the bag is hermetic is, in fact, essential in the medical context to prevent the proliferation of bacteria from the waste. Finally, these organic materials are in limited supply, making them difficult to use for mass production.

It has been proposed to replace a small proportion of the virgin plastic used in a bag with post-industrial recycled plastic, also known as PIR plastic. PIR plastic is a plastic manufactured using recycled plastic resin produced from virgin plastic production scraps in factories. However, it was only possible to use a small proportion of recycled PIR plastic in the bags, the rest being virgin plastic.

Although functional from a mechanical point of view, this option remains limited from an environmental point of view. Given the current state of the art, however, increasing the proportion of recycled plastic in sanitary bags is difficult. Specifically, beyond a small proportion of recycled plastic in a bag, the recycled material used to produce the resin needed to manufacture the bags is considered unstable, as it is difficult to ensure the traceability and repeatability of the plastic waste from which it is made. Moreover, increasing the proportion of recycled plastic makes it difficult to maintain the white color of the product, which is essential for medical use as it is synonymous with hygiene and sterility.

There is thus a need for a sanitary bag which has good mechanical performance, for use in a medical context, and which includes sufficient recycled plastic.

SUMMARY OF THE INVENTION

The invention is directed toward meeting this need, and its subject is thus a sanitary bag for medical use intended for collecting waste produced by a patient, said sanitary bag comprising:

- a leaktight envelope provided with an aperture, the envelope being formed from a plastic film,
- optionally, at least one tie for closing said aperture, notably slidably mounted in a hem of the envelope so that extraction of said closing tie from said hem reduces said aperture, the plastic film of the envelope comprising more than 30% recycled plastic.

The term "for medical use" means that the sanitary bag is a medical device, which may come into contact with a patient's skin. It must thus comply with the Medical Device Regulations (MDR) and the standard ISO 13485.

The waste produced by the patient may be at least partly liquid and/or at least partly solid. It may notably be urine, excrement and/or vomit.

The sanitary bag may be a protective bucket cover and/or a protective bedpan cover. As a variant, the sanitary bag may be a protective toilet seat cover. As a variant, it may be a urinal bag or a vomit bag.

The sanitary bag envelope may contain a waste volume of between 200 and 1000 mL, or even between 400 and 800 mL, for example 450 mL or 500 mL or even 700 mL.

The sanitary bag may be an antimicrobial bag.

The envelope may include identical first and second sheets, superimposed on each other and attached together along right and left side edges and a bottom edge.

The envelope may be free of gussets. The envelope may be free of gripping straps.

The plastic film of the envelope may be less than 40 microns thick, notably between 30 and 36 microns, for example about 32 microns. Reducing the thickness of the plastic film below the "standard" thickness of 40 microns allows the use of less plastic.

The plastic film may be made of polyethylene (PE).

In one embodiment, the sanitary bag may include at least one tie for closing said aperture, the closing tie being notably slidably mounted in a hem of the envelope so that extraction of said closing tie from said hem reduces said aperture.

The closing tie(s) may be ribbons. Each ribbon may have a width greater than 10 mm, better still greater than 15 mm, even better still greater than 20 mm, preferably about 25 mm.

In one embodiment, where the sanitary bag is a urinal bag, the closing tie(s) may be cords. Each cord may have a width greater than 2 mm, better still greater than 5 mm, even better still greater than 10 mm, preferably greater than 15 mm.

The closing tie(s) may be plastic, notably polyethylene.

The recycled plastic may be manufactured from a recycled plastic resin of sufficiently high grade for the melt flow index of the resin to be greater than or equal to 1.40 g/10 min, better still greater than or equal to 1.50 g/10 min, even better still greater than or equal to 1.60 g/10 min and/or for the density of the resin to be greater than 0.9 g/cm$^3$.

The recycled plastic may be manufactured from a recycled plastic resin of sufficiently high grade that the melt flow index of the resin is greater than or equal to 1.40 g/10 min, better still greater than or equal to 1.50 g/10 min, even better still greater than or equal to 1.60 g/10 min. The melt flow index may be measured according to the standard ASTMD1238.

The recycled plastic may be manufactured from a recycled plastic resin of sufficiently high grade that the resin density is greater than 0.9 g/cm$^3$. The density may be measured according to the standard ASTMD792.

The NAT % PLUS grade is a grade used by the company CY Plastique, on a scale notably comprising, from the lowest to the highest grade, the following grades: N1, NIA, NIB, N2, N3, AB, AA, AAA, NAT, NAT %, NAT % PLUS. This NAT % PLUS grade corresponds to a resin with a density of about 0.9169 g/cm$^3$ and a melt flow index of about 1.60 g/10 min. The recycled plastic resin used may be of a grade equal to or higher than the NAT % PLUS grade.

The grade of a resin is an indicator of its quality, depending on its level of contamination with external elements, for instance soil, dust, oil, chemicals or fertilizers. The quality of the resin is thus intrinsically linked to the plastic waste selected to produce it. High-quality resin is the result of a thorough sorting process and the selection of sparingly contaminated plastic waste to produce it. Resins of different grades may be distinguished by their color, attesting to their level of contamination. High-grade resins are thus lighter in color than low-grade resins.

The grade of a resin has an impact on the level of impurities produced during the formation of the plastic film, and also on its mechanical performance, notably its resistance to perforation. Specifically, the more impurities the resin contains and the lower its grade, the greater the risk of holes forming in the plastic film, notably during the plastic extrusion process.

Choosing a high-grade resin to produce the plastic film may thus allow the percentage of recycled plastic in the sanitary bag to be increased, while at the same time maintaining the mechanical performance required for its use in a medical context.

The plastic film of the envelope may include more than 30% post-consumer recycled (PCR) plastic, better still at least 40% PCR plastic, better still at least 50% PCR plastic, even better still at least 60% PCR plastic, even better still at least 70% PCR plastic, even better still at least 80% PCR plastic, even better still at least 90% PCR plastic, notably 100% PCR plastic.

Post-Consumer Recycled (PCR) plastic is manufactured using a recycled plastic resin produced from plastic waste used daily by users, such as plastic bags, supermarket packaging, pallet films, this list being nonlimiting.

The volume of PCR plastic available is much greater than the volume of post-industrial recycled (PIR) plastic available. Moreover, for an industrial group, opting for PCR plastic contributes more strongly to helping the group reduce its carbon footprint, reduce its impact on landfill sites and achieve its overall sustainable development objectives.

The plastic film of the envelope may include more than 30% post-industrial recycled (PIR) plastic, better still at least 40% PIR plastic, better still at least 50% PIR plastic, even better still at least 60% PIR plastic, even better still at least 70% PIR plastic, even better still at least 80% PIR plastic, even better still at least 90% PIR plastic, notably 100% PIR plastic.

Post-industrial recycled plastic is plastic considered to be relatively clean and uniform, and unlikely to contain impurities as it has not been soiled by external use. Post-industrial recycled plastic is readily traceable and capable of meeting the requirements of the MDR regulations and of the standard ISO 13485.

The plastic film of the envelope may include strictly less than 100% post-industrial recycled (PIR) plastic, or even less than 90%, better still less than 80%, even better still less than 70%, even better still less than 60%, even less than 50%, notably less than 40%, or even less than 30% post-industrial recycled (PIR) plastic, better still less than 20%, or even less than 10%, notably 0% PIR plastic. The plastic film of the envelope may be free of post-industrial recycled (PIR) plastic.

The plastic film may include at least 30% low-density polyethylene (LDPE), better still at least 50%, or even at least 70%, notably 100% low-density polyethylene.

Low-density polyethylene (LDPE) may be preferred to high-density polyethylene (HDPE) or linear low-density polyethylene (LLDPE).

The plastic film may notably include less than 30% high-density polyethylene, better still less than 20% or even less than 10%, notably 0% high-density polyethylene (HDPE). The plastic film of the envelope may be free of high-density polyethylene (HDPE). LDPE is less brittle than HDPE. It creases less readily and is less noisy when touched, making it advantageous for use in medical contexts.

The plastic film may include less than 30% linear low-density polyethylene (LLPDE), better still less than 20%, or even less than 10%, notably 0% linear low-density polyethylene. The plastic film of the envelope may be free of linear low-density polyethylene (LLPDE). Unlike LLDPE, LDPE does not require the addition of an additive to make it tackier during its manufacture. By using LDPE, there is thus less risk of observing adhesive marks in the film produced, which may make the bag envelope difficult to open and cause the closing tie(s) to slide poorly in the hem of the envelope.

The recycled plastic resin may be configured so that the plastic film is white in color when viewed under white light and/or has a glossy appearance. The plastic resin may notably be produced from light-colored waste.

The term "white light" means light with a continuous spectrum combining all wavelengths in the visible range.

The term "white color" means the color associated in the RGB code with triplets (r, g, b) such that r, g, b≥245, or even r, g, b≥250, better still r, g, b=255. The difference between two components of the triplet may notably be less than 10, or even 5, better still 2. The white color may be characterized by a visual test based on the pantones 11-0601, 11-4800 TPX, or 11-4001 TCX, for example.

As recalled previously, the color white is synonymous with hygiene and sterility in the medical context. However, it also makes it much easier to see any impurities in the plastic film. The glossy appearance is also appreciated in a medical context, as it is associated with the notion of hygiene.

The plastic film may be manufactured using a recycled plastic resin of sufficiently high grade that the plastic film is white in color and/or has a glossy appearance.

The use of such a high-grade resin also makes it possible to contribute toward reducing the impurities present in the plastic film.

The recycled plastic may be manufactured using recycled plastic resin produced from plastic waste, said plastic waste being highly traceable, notably originating from a single supplier.

The term "highly traceable" means that the supplier(s) of the plastic waste on which the resin is based can be readily identified, and that the plastic waste used can be tracked through its recycling process. The supplier(s) of plastic waste may notably comply with the standard EN 15343: 2007 regarding the traceability of recycled plastics.

Choosing a resin produced from highly traceable plastic waste ensures the stability and repeatability of the resin manufacturing process, thereby making the recycled material more "stable".

A ratio of foreign bodies to plastic in the plastic waste used to produce the resin may be less than 10/90, better still less than 3/97, even better still less than 1/99.

The term “foreign body” means any element which is not plastic, but which may pass through the first sorting of plastic waste that is performed. A foreign body may be, for example, a printing label stuck to a plastic film.

This ratio indicates the proportion of foreign bodies contained in a batch of waste from a supplier. The lower this ratio, the easier it will be to sort the waste, the less “contaminated” the waste will be and thus the higher the grade of the resin produced therefrom.

Recycled plastic may be manufactured using a recycled plastic resin, the recycled plastic resin being produced from the same type of plastic waste.

The recycled plastic resin may be produced, for example, from the plastic bags of a given supermarket.

This identification of a supplier and a type of plastic waste contributes to the traceability of the recycled plastic resin. This makes it possible to recommend a resin of similar quality, produced from the same plastic sources, thereby facilitating the stability and repeatability of the resin manufacturing process.

Recycled plastic resin may be produced from a single plastic waste, notably low-density polyethylene.

Recycled plastic resin may be produced from the inner film of jumbo bags, which ensures watertightness. This product is advantageous because it is virgin, uncontaminated plastic, and moreover has a white color when observed under white light.

Recycled plastic resin may be produced from plastic waste other than agricultural plastic waste. Plastic waste from agriculture is too contaminated with external elements, such as soil, dust, oil, chemicals or fertilizers, for example, for a resin derived from such waste to be compatible with medical use, notably for it to comply with the MDR regulations. Plastic waste from agriculture results in plastic resins whose grade may not exceed NIA, using the grades defined by the company CY Plastique listed above. Waste from the fashion and/or logistics industry results in resins with grades between AB and NAT % PLUS.

PCR plastic may be manufactured using recycled plastic resin produced from plastic waste from, for example, logistics circuits or hypermarkets.

The closing tie(s) may include at least 30% PIR plastic, better still at least 50%, or even at least 70%, notably 100% PIR plastic, and/or at least 30% high-density polyethylene (HDPE), better still at least 50%, or even at least 70%, notably 100% HDPE.

The plastic film may include at least one additive, which may be chosen from the following list: glidant agents, antimicrobial agents, this list being nonlimiting. The plastic material may include between 1 and 2% additive. The use of glidants in polyethylene films allows the coefficient of friction (COF) to be reduced while at the same time retaining the optical properties of gloss, transparency and clarity. The plastic film may include a sliding agent, preferentially between 1 and 3% sliding agent, better between 1.5 and 2.5% sliding agent, for instance 2% sliding agent approximately. The sliding agent may be the sliding agent Zip-33E, supplied by the JUSU company.

The closing tie(s) may include a sliding agent, preferentially between 0.5 and 1.5% sliding agent, better between 0.8 and 1.2% sliding agent, for instance 1% sliding agent approximately. The sliding agent may be the sliding agent Zip-33E, supplied by the JUSU company.

Recycled plastic is less slippery than virgin plastic, so a bag with a high proportion of recycled plastic in both the film of the envelope and the closing ties may have difficulty sliding the ties. The use of sliding agents in the plastic film of the envelope and/or in the closing tie(s) helps to reduce this problem.

The recycled plastic may be manufactured using a recycled plastic resin produced from plastic waste, the plastic waste on which the recycled plastic resin is based being heated during resin production to a temperature above 200° C., better still above 220° C., notably about 230° C.

The high temperature to which the plastic waste is heated enables at least some, or even all, of the possible pathogens to be eliminated.

A subject of the invention is also a process for manufacturing a recycled plastic resin, including at least one of the following steps, or even all of the following steps:

a) selecting at least one supplier, notably a single supplier, of plastic waste not originating from agriculture,
b) identifying a type of plastic waste to be selected for resin production, preferably a sparingly contaminated plastic waste, which is notably transparent or white in color, for example the inner film of jumbo bags,
c) performing one or more, notably at least two, or even at least three, better still at least four, or even five, manual and/or automatic sorting operations on the plastic waste,
d) heating the sorted plastic waste to a temperature above 200° C., better still above 220° C., notably about 230° C.

The process may include a step e) in which post-production controls are performed to check the quality of the recycled resin produced. These post-production tests may be based on the standards ASTMD1238 and ASTMD792.

The process may include a step f) in which the traceability of the plastic resin produced is ensured by associating a batch number with each batch produced.

The plastic waste supplier(s) may have certificates allowing them to obtain independently certified plastic resin from this plastic waste.

Recycled plastic resin may be manufactured in a plant that separates the resin production lines according to their grade.

Recycled plastic resin may be manufactured in a plant that does not produce low-grade resins, notably produced from agricultural plastic waste.

The separation of production lines or even of resin production plants avoids contamination of high-grade resins with low-grade resins, for example obtained from agricultural plastic waste.

The staff at the plant manufacturing the recycled plastic resin may be trained to ensure that they are capable of sorting the plastic waste and categorizing it according to its level of contamination.

The plastic waste on which the recycled plastic resin used is based may result from a sorting process including several, notably at least two, or even at least three, better still at least four, or even five, manual sorting operations.

Each production line may be completely cleaned each time there is a change of plastic waste supplier and/or plastic waste type.

The manufacturer of the recycled plastic resin may have EUCERPLAST certification. The EUCERPLAST certificate is based on the standard EN15343 relating to the traceability of materials used for producing recycled material. The certificate may stipulate that the supplier has the highest level of traceability and therefore of sorting, i.e. level 1.

The manufacturer of recycled plastic resin may have GRS certification. This certification ensures that the recycling process complies with environmental and social criteria.

These certifications allow compliance with certain regulatory requirements and are a guarantee of quality, notably to ensure stability in the quality of the resin produced.

The resin manufacturer may perform at least one test evaluating the biocompatibility of the recycled plastic resin.

The manufacturer may perform a chemical characterization test based on the standard ISO 10993-18. This test makes it possible to determine whether the resin contains substances that are notably carcinogenic, allergenic, irritant or mutagenic.

The bag manufacturer may perform a cytotoxicity test based on the standard ISO 10993-5-2009. He may also perform a sensitization test to ensure that the product does not present any risks when it comes into contact with the patient.

The plastic film of the envelope may be produced using a blown film machine equipped with a filter with a mesh size of between 85 and 120 mesh, notably about 100 mesh. The filter may be changed regularly, notably every 24 hours, preferably every 12 hours.

The use of a filter with a mesh size of between 85 and 120 mesh, which is changed very regularly, allows the level of impurities in the plastic film to be reduced even further.

The sanitary bag may contain an absorbent pad.

The absorbent pad may gel bodily fluids (vomit, urine, excreta) so as to limit their spread. The absorbent pad may consist of a mixture of absorbent cotton and a superabsorbent polymer powder.

The absorbent pad may be attached to an inner face of said envelope, notably by means of a reversible and preferably reusable adhesive.

The envelope may include identical first and second sheets, superimposed on each other and attached together along right and left side edges and a bottom edge, the absorbent pad being attached to only one of said first and second sheets.

According to another of its aspects, a subject of the invention is also a strip of sanitary bags as defined previously, each sanitary bag being attached via at least one side edge to an adjacent sanitary bag, said sanitary bags being notably separated from each other by at least one weakness line extending along said side edge(s). The strip may comprise between 10 and 30 sanitary bags, notably 20.

According to another of its aspects, a subject of the invention is an assembly including:

- a plurality of sanitary bags as defined previously, notably in the form of a strip as defined previously, and
- a packaging in which said sanitary bags are housed.

The packaging may be a box, for example a cardboard box. Preferably, the packaging is a 100% recycled cardboard box.

The packaging may be recyclable. It may be Chain of Control-certified by the Forest Stewardship Council (FSC). This certificate ensures that FSC materials can be traced at every step in the production process, from the forest to the finished product, including all successive treatment, transformation, manufacturing and distribution steps. According to another of its aspects, a subject of the invention is, finally, a process for manufacturing a sanitary bag as defined previously, including the following steps:

a) confirming a grade of a supplied recycled plastic resin, notably low-density polyethylene, b) preparing a mixture from the recycled plastic resin and optionally a glidant and/or anti-moisture agent masterbatch, c) filling a blown film machine with said mixture, the machine notably having been cleaned beforehand, d) placing a filter, notably a new filter, with a mesh size of between 85 and 120 mesh, notably about 100 mesh, in the blowing machine, the filter being notably intended to be replaced regularly, notably at least every 24 hours, or even every 12 hours, e) blowing a film with the blowing machine.

The respective proportions of the elements in the mixture of step b) may be optimized to obtain a white, glossy plastic film. The masterbatch may include other additives.

As explained previously, the use of glidants in polyethylene films allows the coefficient of friction (COF) to be reduced while at the same time retaining the optical properties of gloss, transparency and clarity.

Recycled plastic resin contains more moisture than non-recycled resin due to the numerous washes performed during its production. This moisture may lead to the formation of bubbles during extrusion of the plastic film, which the presence of an anti-moisture agent in the mixture during step b) helps to prevent.

Using a filter with a mesh size of between 85 and 120 mesh, notably about 100 mesh, and changing it regularly, for example every 24 hours or every 12 hours, reduces the impurities in the bag, as explained previously.

The manufacturing process may include a step f) in which the film is left to stand in the open air for at least 24 hours. Leaving the film to stand in the open air tends to reduce the unpleasant odor that may accompany film production. This also helps to make the film less tacky.

The manufacturing process may include a step following step e) or step f) defined previously, in which at least one item of information is printed on the film. The information printed on the film may comprise, inter alia, the brand name, the brand logo, the product name, information regarding the volume of waste that can be contained in the bag, or mention of the percentage of recycled plastic. The printing parameters may be varied at this step to obtain a quality print.

The manufacturing process may include a step of assembling the bag from the film, preferably following a step of printing at least one item of information on the film.

The manufacturing process may include a step in which an absorbent pad is inserted into the bag.

BRIEF DESCRIPTION OF THE DRAWINGS

The invention may be understood more clearly on reading the following description, of nonlimiting examples of its implementation, and on examining the appended drawing, in which.

DETAILED DESCRIPTION

Figure 1:
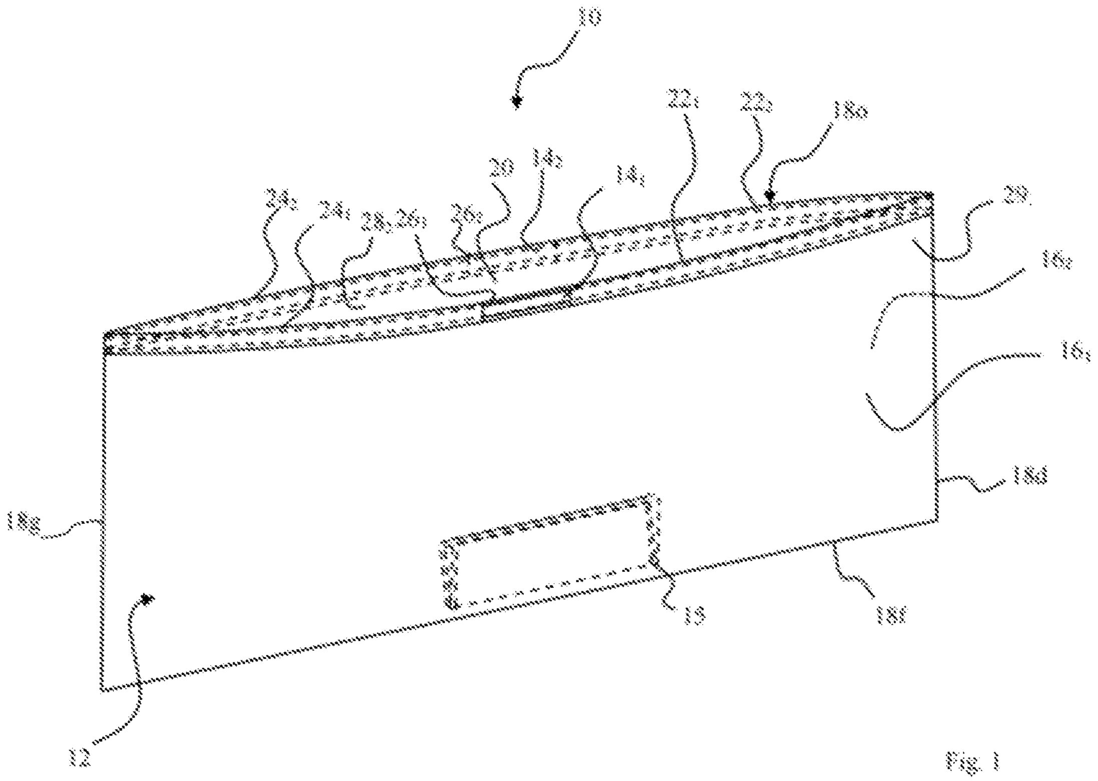
FIG. 1 represents a sanitary bag according to the invention.

FIG. 1 shows a disposable sanitary bag 10 intended for collecting waste, which is notably at least partly liquid, from a patient. The sanitary bag 10 is a protective bucket and/or bedpan cover. It may contain a volume of waste of, for example, 450 mL.

The sanitary bag 10 includes an envelope 12 with an aperture 20 and first and second closing ties 141 and 142. The envelope 12, generally rectangular in shape when the bag is flat, includes first and second sheets 161 and 162, respectively, of similar dimensions, superimposed and attached together, in a leaktight manner, along a right side edge **18*d*, a left side edge 18*g* and a bottom edge 18*f*** connecting the lower ends of the right and left side edges. The first and second sheets may result from folding a sheet along the bottom edge 18*f*. The right and left side edges may be sealed, for example, by welding. The envelope is free of gussets. It is also free of gripping straps.

The aperture 20 of the sanitary bag is defined by an opening edge 180 consisting of the first and second free edges 221 and 222 of the first and second sheets, respectively. Along the first and second free edges, the first and second sheets define first and second hems 241 and 242, respectively, interrupted with first and second windows 261 and 262, respectively. The first and second closing ties are slidably mounted in the first and second hems, respectively. They are accessible through the first and second windows, respectively. Their right and left ends are attached to the right 18*d* and left 18*g* edges of the envelope, respectively, so that their extraction through the first and second windows, respectively, or "tightening", causes contraction of the first and second free edges 221 and 222, and thus throttling of the aperture 20. The first and second sheets 161 and 162 define first and second inner faces 281 and 282.

The closing ties 141 and 142 are ribbons. These ribbons are wider than 20 mm, notably about 25 mm. The closing ties 141 and 142 may include at least 30% PIR plastic, notably 100% HDPE in the example described.

Envelope 12 includes an absorbent pad 15. This pad 15 consists of a mixture of absorbent cotton and a superabsorbent polymer powder. The volume of the absorbent pad is suitable for absorbing liquid waste introduced into the envelope by the patient.

The absorbent pad 15 is attached to at least one of the inner faces of the envelope, preferably to the second inner face 282 only. The pad 15 is attached by means of a reversible adhesive, i.e. chosen so as to allow the absorbent pad 15 and/or the second sheet to be peeled off without damaging the absorbent pad 15 and/or the second sheet, respectively.

The envelope 12 is made of a plastic film 29 including more than 30% recycled plastic. This plastic film is less than 40 microns thick, notably about 32 microns. The recycled plastic is manufactured from a recycled plastic resin from the company CY Plastique with a grade greater than or equal to the NAT % PLUS grade. The recycled plastic resin used has a density of about 0.9169 g/cm$^3$ and a melt flow index of about 1.60 g/10 min. The plastic film 29 of envelope 12 may include more than 30% post-consumer recycled (PCR) plastic, and notably, in the example described, 100% PCR plastic.

The material film 29 may include at least 30% low-density polyethylene (LDPE), and notably, in the example described, 100% low-density polyethylene.

The recycled plastic resin is configured so that the plastic film 29 is white in color when viewed in white light and has a glossy appearance.

The recycled plastic film 29 is manufactured using recycled plastic resin produced from plastic waste originating from a single supplier. The recycled plastic resin is produced from the same type of plastic waste. It is the inner film of jumbo bags.

Figure 2:
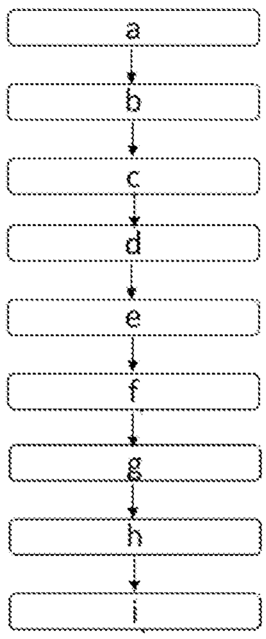
FIG. 2 illustrates the main steps involved in manufacturing a sanitary bag according to the invention.

FIG. 2 schematically illustrates a process that can be performed for manufacturing a sanitary bag 10 according to the invention.

In a first step a), a grade of a recycled plastic resin, notably low-density polyethylene supplied, is confirmed.

In step b), a mixture is prepared from the recycled plastic resin and optionally a glidant masterbatch. The respective proportions of the elements in this mixture are optimized to obtain a white, glossy plastic film 29.

In step c), a blown film machine is filled with said mixture, the machine notably having been cleaned beforehand.

Step d) involves placing a filter, notably a new filter, with a mesh size of between 85 and 120 mesh, notably about 100 mesh, in the blowing machine, said filter being intended to be replaced notably at least every 24 hours, or even every 12 hours.

Step e) is the step of blowing the film with the blowing machine.

Optionally, the process is completed by step f), in which the film is left to stand in the open air for at least 24 hours.

The process may also optionally include a step g) following these steps, in which at least one item of information is printed on the film, notably information regarding the brand and logo of the manufacturer of the sanitary bag 10, or information regarding the volume of waste contained in the bag 10.

A step h) of assembling the bag 10 from the plastic film 29 may be included in this process. Finally, the process may include step i) of inserting the absorbent pad 15 into the bag 10.

The invention is not limited to the examples described.

The sanitary bag 10 may be a urinal bag or a vomit bag. In this embodiment, the closing tie(s) may be cords.

In one embodiment, the plastic film 29 of the envelope 12 may include more than 30% post-industrial recycled (PIR) plastic, better still at least 40% PIR plastic, better still at least 50% PIR plastic, even better still at least 60% PIR plastic, even better still at least 70% PIR plastic, even better still at least 80% PIR plastic, even better still at least 90% PIR plastic, notably 100% PIR plastic.

The absorbent pad 15 may also, for example, be housed in the envelope, without being attached thereto.

The invention claimed is:

1. A sanitary bag for medical use comprising:

a leaktight envelope provided with an aperture, the envelope being formed from a plastic film configured to hold bodily waste produced by a patient and to prevent passage of bacteria from the bodily waste, wherein the plastic film of the envelope comprises more than 30% recycled plastic, said recycled plastic being manufactured from a recycled plastic resin of sufficiently high grade that a melt flow index of the resin is greater than or equal to 1.40 g/10 min.

2. The sanitary bag as claimed in claim 1, said recycled plastic being manufactured from a recycled plastic resin of sufficiently high grade that a density of the resin is greater than 0.9 g/cm$^3$.

3. The sanitary bag as claimed in claim 1, the plastic film of the envelope including more than 30% post-consumer recycled (PCR) plastic.

4. The sanitary bag as claimed in claim 1, the plastic film of the envelope including more than 30% post-industrial recycled (PIR) plastic.

5. The sanitary bag as claimed in claim 1, the plastic film including at least 30% low-density polyethylene (LDPE).

6. The sanitary bag as claimed in claim 1, said recycled plastic resin being configured so that the plastic film is white in color when viewed under white light and has a glossy appearance.

7. The sanitary bag as claimed in claim 1, the recycled plastic resin being produced from plastic waste, said plastic waste being traceable to a single supplier.

8. The sanitary bag as claimed in claim 1, further comprising at least one closing tie for closing said aperture, the closing tie being slidably mounted in a hem of the envelope so that extraction of said closing tie from said hem reduces said aperture, the at least one closing tie including at least 30% PIR plastic, and/or at least 30% high-density polyethylene (HDPE).

9. The sanitary bag as claimed in claim 1, the plastic film including at least one additive chosen from the following list: glidants or antimicrobial agents.

10. The sanitary bag as claimed in claim 1, the recycled plastic resin being produced from plastic waste, the plastic waste being heated during production of the recycled plastic resin to a temperature greater than 200° C.

11. The sanitary bag as claimed in claim 1, the plastic film of the envelope being produced by a blown film machine equipped with a filter having a mesh size of between 85 and 120 mesh.

12. The sanitary bag as claimed in claim 1, further comprising an absorbent pad.

13. The sanitary bag as claimed in claim 12, the absorbent pad being attached to an inner face of said envelope by a reversible adhesive.

14. The sanitary bag as claimed in claim 12, in which the envelope includes first and second identical sheets superimposed on each other and attached together along right and left side edges and a bottom edge, the absorbent pad being attached to only one of said first and second sheets.

15. A strip of sanitary bags as claimed in claim 1, each sanitary bag being attached by at least one side edge to an adjacent sanitary bag, said sanitary bags being separated from each other by at least one weakness line extending along said at least one side edge.

16. An assembly including:

a plurality of sanitary bags as claimed in claim 1, and a packaging in which said sanitary bags are housed.

17. A process for manufacturing a sanitary bag as claimed in claim 1, comprising:

a) confirming a grade of a recycled plastic resin, b) preparing a mixture from the recycled plastic resin, c) filling a blown film machine with said mixture, d) placing a filter with a mesh size of between 85 and 120 mesh in the blowing machine, e) blowing a film with the blowing machine.

18. The process as claimed in claim 17, further comprising including a glidant and/or anti-moisture agent masterbatch in the mixture.

19. The process as claimed in claim 17, further comprising heating a plastic waste from which the recycled plastic resin is formed to a temperature greater than 200° C. during production of the recycled plastic resin.

20. The sanitary bag as claimed in claim 1, further comprising at least one closing tie for closing said aperture, the closing tie being slidably mounted in a hem of the envelope so that extraction of said closing tie from said hem reduces said aperture.

* * * * *